April 14, 1970　　A. E. REVELL ET AL　　3,505,786
GAS FILTER APPARATUS
Filed Nov. 5, 1968
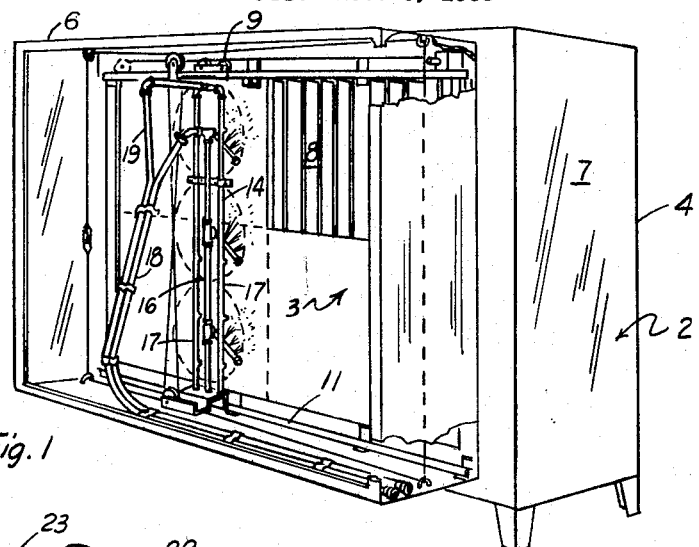
Fig. 1
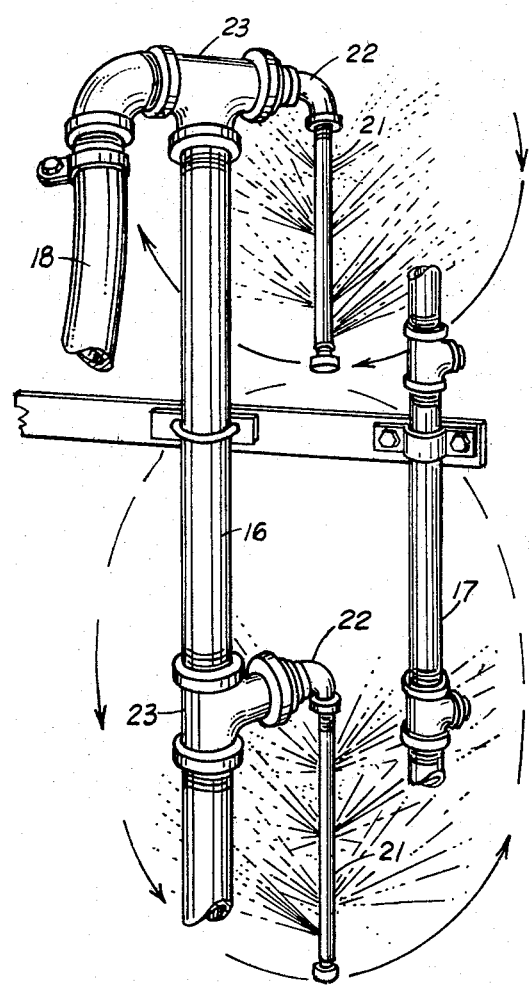
Fig. 2
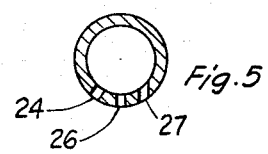
Fig. 5
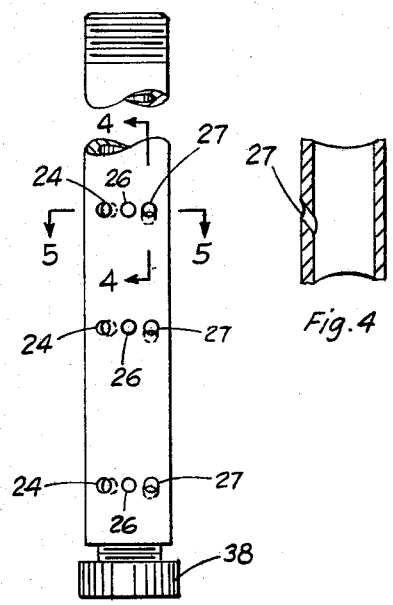
Fig. 3
Fig. 4
INVENTORS
Alan E. Revell,
Wilson A. Welch
BY Ralph B. Brick United States Patent Office 3,505,786
Patented Apr. 14, 1970

3,505,786
GAS FILTER APPARATUS
Alan E. Revell and Wilson A. Welch, Louisville, Ky., assignors to American Air Filter Company, Inc., Louisville, Ky., a corporation of Delaware
Filed Nov. 5, 1968, Ser. No. 773,506
Int. Cl. B03c 3/78, 3/74; B01d 46/12
U.S. Cl. 55—118                              5 Claims

ABSTRACT OF THE DISCLOSURE

An improved washing device for gas filter apparatus of the plate electrode assembly type wherein a longitudinally extending fluid washer is pivotally mounted to rotate about a pivot axis in a plane parallel to the face of the gas treating plate electrode assembly, the wall of the washer being provided with a plurality of apertures through which fluid passes to flush the plate electrode assembly, one aperture being so positioned in the fluid washer to propel the washer and introduce flushing liquid along one side of the plates of the plate electrode assembly and at least a second aperture so positioned in the fluid washer to introduce flushing liquid along the other side of the plates of the plate electrode assembly.

BACKGROUND OF THE INVENTION

The present invention relates to fluid filters and finds particular utility in the gas separation art where spaced, charged, and grounded electrode plates are alternatively arranged for electrostatically treating a gas stream to be cleaned, the plates intermittently being flushed to remove particulate materials collected thereon.

In electrostatic gas filters, a gas stream to be treated passes through a housing having upstream and downstream openings. Filter assemblies comprised of parallel, spaced, charged, and grounded electrode plates are disposed within the housing between the openings of such housing. The plates of each of the assemblies are arranged alternately to electrostatically treat the gas stream so that solid particles in the stream are deposited and held hereon, the plates often being coated with a suitable adhesive to enhance particle retention. At selected intervals, precipitating operations are interrupted so that deposits precipitated on the plates can be removed. Once this has been accomplished, precipitating operations are resumed effectively.

To remove deposits from the precipitator plates in the past, various washing arrangements have been utilized. For the most part, these washing arrangements have required large amounts of washing fluid which have not been dispelled effectively during operations. Further, past mechanisms required to effect the spraying of the filter assembly have been complex and costly and have presented concomitant problems in construction and maintenance. In addition, the flushing apparatus has occupied a substantial amount of space and during nonflushing operations has presented resistance problems to the gas stream being treated.

In accordance with the present invention, a washing apparatus is provided for a gas filter assembly which avoids the abovementioned disadvantages and problems, the present invention providing a washing apparatus which is economical to construct and maintain, which requires a minimum of moving parts, and a minimum of hardware which eliminates expensive nozzle hardware, and at the same time, dispels flushing liquid effectively, and which occupies a minimum of space during gas treating operations.

Various other features of the present invention will become obvious to one skilled in the art upon reading the disclosure set forth hereinafter.

More particularly, the present invention provides an electrostatic gas filter apparatus comprising: a flow-through housing having dirty gas stream inlet means and clean gas outlet means; plate electrode assembly means including parallel, spaced, charged, and grounded electrode plates alternately arranged for electrostatically treating a gas stream, said plate electrode assembly means being disposed within the housing between the dirty gas stream inlet means and the clean gas outlet means; and longitudinally extending fluid washer means pivotally mounted at one end thereof to rotate about a pivot axis through a complete circle in a plane of rotation spaced from and parallel a face of the plate electrode assembly means, the plane of rotation being normal to the direction of flow of the gas stream to be treated, the fluid washer means including at least first and second outlet apertures disposed in the wall of the washer means adjacent the end opposite the pivot axis in such a manner that when the longitudinal axis of the washer means is in vertical position, the first aperture has its flow axis in a horizontal plane substantially parallel to a horizontal plane determining the pivot axis and in a vertical plane positioned at an angle to the plane of rotation of the washer to provide fluid flow therethrough which fluid propels the washer means about the pivot axis and provides fluid to wash one side of the plates of the electrode assembly, the second aperture having its flow axis in a vertical plane normal to the plane of rotation of the washer and at an angle to the pivot axis to wash the other side of the plates of the electrode assembly.

The present invention further provides a third aperture in the wall of the washer positioned intermediate the first and second apertures and having its flow axis substantially parallel the pivot axis and in a plane normal to the plane of rotation of the washer to provide fluid flow along the plates of the electrode assembly.

It is to be understood that various changes can be made in the arrangement, form, and construction of the apparatus disclosed herein without departing from the scope or spirit of the present invention.

Referring to the drawing:

FIGURE 1 is a perspective view of an electrostatic type gas filter apparatus embodying the features of the present invention, the plates of the filter assembly being disclosed schematically;

FIGURE 2 is an enlarged isometric view of the novel fluid washer device of the present invention;

FIGURE 3 is a still further enlarged broken view of the novel washer apparatus of FIGURE 2;

FIGURE 4 is a cross-sectional view of one aperture taken in a plane passing through line 4—4 of FIGURE 3; and FIGURE 5 is a cross-sectional view of the apparatus of FIGURE 3 taken in a horizontal plane passing through line 5—5 of FIGURE 3.

Referring to FIGURE 1 of the drawing, an embodiment of the inventive apparatus is disclosed in conjunction with an otherwise conventional electrical dust precipitator housing 2 similar to that disclosed in assignee's United States Patent No. 3,159,471, issued to Alan E. Revell on Dec. 1, 1964. Housing 2 is disclosed as having spaced opposed upstream dirty gas inlet opening 3 and downstream clean gas outlet opening 4. Housing 2 includes an upstream open end housing section 6 which incorporates the fluid treating structure and a downstream open-ended housing section 7 communicating with housing 6 and serving to house plate electrode assembly gas cleaning means indicated broadly by reference numeral 8. The gas cleaning means 8 includes an ionizing section and a collector section comprised of plate electrode assemblies each including parallel, spaced, charged and grounded electrode plates alternately arranged for electrostatically treating a gas stream. Since the gas cleaning means itself does not constitute a critical part of the present invention, it is not described in detail herein.

Housing section 6, as also is known in the art, includes spaced track members 9, 11 and has mounted therebetween in vertically extending position fluid header assembly 14. Assembly 14 includes spaced vertically extending washing and adhesive conduits 16 and 17, respectively, which are connected to suitable fluid supply sources (not shown) through hose connecting arrangements 18 and 19, respectively. It is to be understood that any one of a number of known control arrangements can be connected to the washer assembly arrangement herein described in order to insure a proper cycling of fluid through conduits 16 and 17. Since the control arrangement does not constitute an essential part of the present invention, details thereof are not disclosed herein.

Referring to FIGURE 2 of the drawing, the novel features of washing conduit 16 are set forth in detail therein. Pivotally mounted to conduit 16 are a plurality of longitudinally extending spaced fluid washing conduits 21. As disclosed in FIGURE 1 of the drawings, three such fluid washer conduits are utilized, but it is to be understood that the number of conduits can be varied in accordance with the geometric configuration and proportions of the over-all assembly. It further is to be understood that adjacent washer conduits 21 are arranged to counter-rotate about their respective pivot axes to avoid undesirable vibration and canting. Each conduit 21 is threaded at one end thereof to a right angle connection 22 which in turn is mounted for rotation through a suitable bushing and sleeve assembly (not disclosed in detail) to an end of a T-connection 23 positioned in the header conduit 16. As can be seen in FIGURE 3 of the drawing, each longitudinally extending conduit 21 has disposed in the wall thereof spaced parallel rows of spaced apertures extending in spaced relationship substantially parallel the longitudinal axis of the fluid washer 21, the apertures of each row being designated respectively by reference numerals 24, 26, and 27. These apertures are disposed in their conduit 21 adjacent the end opposite the pivot axis of the conduit. When the conduit 21 is in vertical position, apertures 24 of the first row of apertures each has its flow axis in a horizontal plane substantially parallel to a horizontal plane determining the pivot axis of the conduit and in a vertical plane positioned at an angle to the plane of rotation of the conduit 21. With such an arrangement, the apertures 24 provide fluid flow therethrough which propels the conduit 21 in rotation about its pivot axis to wash one side of the plates of the plate electrode assembly. The row of apertures 26 immediately adjacent thereto are each so positioned in the wall of conduit 21 so as to have its flow axis substantially parallel the pivot axis of the conduit in a vertical plane normal to the plane of rotation of the washer to provide fluid flow along the plates of the plate electrode assembly. The row of apertures 28 are each so positioned in the wall of conduit 21 so as to have its flow axis in a vertical plane normal to the plane of rotation of the washer and at an angle to the pivot axis of the conduit to wash the other side of the plates of the electrode assembly. Thus, with the arrangement aforedescribed, it is possible to thoroughly wash the precipitator plates from both sides, the fluid serving to propel conduit 21 during gas treating operation. With the fluid turned off, conduits 21 rest in a vertical position parallel header 16 and out of the gas stream.

It is to be noted that fastened at the end of each conduit 21 opposite its pivot axis in screwed relationship thereto is a polyurethane plug 28. With such an arrangement, it is possible to unscrew the plug at selected intervals to cleanse conduit 21, removing any undesirable contaminants which might have collected on the interior of the conduit.

The invention claimed is:
1. An electrostatic gas filter apparatus comprising: a flow-through housing having dirty gas stream inlet means and clean gas outlet means; plate electrode assembly means including parallel, spaced, charged and grounded electrode plates alternately arranged for electrostatically treating a gas stream, said plate electrode assembly means being disposed within said housing between said dirty gas stream inlet means and said clean gas outlet means; and longitudinally extending fluid washer means pivotally mounted to rotate about a pivot axis through a complete circle in a plane of rotation spaced from and parallel a face of said plate electrode assembly means, said plane of rotation being normal to the direction of flow of the gas stream to be treated, said fluid washer means including at least first and second outlet aperture means disposed in the wall of said washer means adjacent the end opposite said pivot axis in such a manner that when the longitudinal axis of said washer means is in vertical position, said first aperture means has its flow axis in a horizontal plane substantially parallel to a longitudinal plane determining said pivot axis and in a vertical plane positioned at an angle to the plane of rotation of the washer to provide fluid flow therethrough which fluid propels said washer means about its pivot axis to wash one side of the plates of said electrode assembly, said second aperture means having its flow axis in a vertical plane normal to the plane of rotation of the washer and at an angle to the axis of rotation to wash the other side of the plates of said electrode assembly.

2. The apparatus of claim 1, and an intermediate aperture means having its flow axis substantially parallel said pivot axis in a vertical plane normal to the plane of rotation of the washer to provide fluid flow along the plates of the electrode assembly.

3. The apparatus of claim 1, said aperture means comprising spaced rows of spaced apertures, the rows extending substantially parallel the longitudinal axis of said fluid washer means.

4. The apparatus of claim 1, said fluid washer means including a main fluid conduit header and at least two fluid washer conduits pivotally mounted at their extremities to said header to counter-rotate relative each other about spaced pivot axes.

5. The apparatus of claim 1, said longitudinally extending fluid washer means including a removable plug member at the extremity opposite said pivot axis to permit periodic cleansing of the interior of said washer means.

References Cited
UNITED STATES PATENTS

| | | | |
|---|---|---|---|
| 2,476,248 | 7/1949 | MacKenzie | 55—118 |
| 3,055,158 | 9/1962 | Smith | 55—118 |
| 3,159,471 | 12/1964 | Revell | 55—118 |
| 3,372,529 | 3/1968 | Harms | 55—118 |

FOREIGN PATENTS 975,017    7/1961    Germany.

HARRY B. THORNTON, Primary Examiner

D. E. TALBERT, Jr., Assistant Examiner

U.S. Cl. X.R.

55—120, 294; 239—251, 265.11